United States Patent
Koshy et al.

(10) Patent No.: US 7,539,718 B2
(45) Date of Patent: May 26, 2009

(54) METHOD AND APPARATUS FOR PERFORMING MONTGOMERY MULTIPLICATIONS

(75) Inventors: Kamal J. Koshy, San Jose, CA (US); Gilbert Wolrich, Framingham, MA (US); Jaroslaw J. Sydir, San Jose, CA (US); Wajdi K. Feghali, Boston, MA (US)

(73) Assignee: Intel Corporation, Santa Clara, CA (US)

(*) Notice: Subject to any disclaimer, the term of this patent is extended or adjusted under 35 U.S.C. 154(b) by 750 days.

(21) Appl. No.: 10/944,354

(22) Filed: Sep. 16, 2004

(65) Prior Publication Data

US 2006/0059220 A1   Mar. 16, 2006

(51) Int. Cl.
*G06F 7/38* (2006.01)
(52) U.S. Cl. .................................... 708/491
(58) Field of Classification Search ................. 708/491
See application file for complete search history.

(56) References Cited

U.S. PATENT DOCUMENTS 6,732,133 B2 * 5/2004 Ruehle ........................ 708/491
6,973,470 B2 * 12/2005 Takahashi et al. ........... 708/491
7,240,204 B1 * 7/2007 Koc et al. .................... 713/174
7,266,577 B2 * 9/2007 Ikeda et al. .................. 708/491

OTHER PUBLICATIONS

A. Menezes, et al., "Chapter 14: Efficient Implementation," Handbook of Applied Cryptography, CRC Press, 1996, pp. 591-634.

C. McIvor et al., "Fast Montgomery Modular Multiplication and RSA Cryptographic Processor Architectures", The Institute of Electronics, Communications and Information Technology, School of Electrical and Electronic Engineering, The University of Belfast, pp. 1-6, Belfast, Ireland, May 25, 2002, published on Workshop on Complexity-Effective Design, Anchorage, Alaska. (Previously submitted).

M. Schimmler et al., "Area-Time Efficient Montgomery Modular Multiplications", Institute for Computer Engineering and Communication Networks, Technical University of Braunschweig, pp. 1-13, Braunschweig, Germany, 2003, published in the proceedings of 37th Annual Asilomar Conference on Signals, Systems, and Computers. (Previously submitted).

J. Wang et al., "A Staged Carry-Save-Adder Array for Montgomery Modular Multiplication", Department of Electrical Engineering, National Cheng Kung University, pp. 1-4, Taiwan, R.O.C. Aug. 6, 2002, 2002 IEEE Asia-Pacific Conference on ASIC. (Previously submitted).

* cited by examiner

*Primary Examiner*—Chuong D Ngo
(74) *Attorney, Agent, or Firm*—Guojun Zhou (57) ABSTRACT

An arrangement is provided for performing Montgomery multiplications. A Montgomery multiplication comprises a plurality of iterations of basic operations (e.g., carry-save additions), and is performed by a Montgomery multiplication engine (MME). Basic operations in each iteration may be performed by multiple Montgomery multiplication processing elements (MMPEs). An MME may be arranged to pipeline the process of performing iterations of multiple basic operations and other operations required to complete a Montgomery multiplication both horizontally and vertically. An MME may also be arranged to interleave processes of performing two Montgomery multiplications.

16 Claims, 9 Drawing Sheets

```
Line 1:  function ModExp(A, e, m)
         {
Line 2:      a = (A • r) mod m;
Line 3:      x = (1 • r) mod m;
Line 4:      for i = (n-1) downto 0
             {
Line 5:          x = MontMult(x, x, m);
Line 6:          if e[i] = 1 then x = MontMult(x, a, m);
             }
Line 7:      X = MontMult(x, 1, m);
Line 8:      return X;
         }
```

| Line 1: | function MontMult(x, y, m); |
| --- | --- |
| | { |
| Line 2: | T = 0; |
| Line 3: | for i = 0 to k-1 |
| | { |
| Line 4: | Z = (T + x[i] • y) (mod 2); |
| Line 5: | T = (T + Z • m + x[i] • y) / 2; |
| | } |
| Line 6: | if T >= m then T = (T – m); |
| Line 7: | return T; |
| | } |

© 2004 INTEL CORPORATION

FIGURE 4B

| Line 1: | function MontMult(x, y, m); |
| --- | --- |
| | { |
| Line 2: | T = 0; |
| Line 3: | for i = 0 to k-1 |
| | { |
| Line 4: | T = (T + (T[0] xor (x[i] • y[0])) • m + x[i] • y); |
| Line 5: | T = T / 2; |
| | } |
| Line 6: | if T >= m then T = (T – m); |
| Line 7: | return T; |
| | } |

© 2004 INTEL CORPORATION

FIGURE 4C

| Line 1: | function MontMult(x, y, m); |
| --- | --- |
| | { |
| Line 2: | T = 0;  /* C = 0; S = 0; T = C + S */ |
| Line 3: | for i = 0 to k-1 |
| | { |
| Line 4: | (C, S) = (C + S + sel_m • m + sel_y • y + sel_m&y • (m + y)); |
| Line 5: | C = C/2; S = S/2;  /* T = T / 2; */ |
| | } |
| Line 6: | if T >= m then T = (T – m);  /* T = C + S; */ |
| Line 7: | return T; |
| | } |

FIGURE 5

| BIT BLOCK / CYCLE | BLOCK 5 | BLOCK 4 | BLOCK 3 | BLOCK 2 | BLOCK 1 |
|---|---|---|---|---|---|
| CYCLE 1 | | | | | P[0] |
| CYCLE 2 | | | | P[0] | Q[0] |
| CYCLE 3 | | | P[0] | Q[0] | P[1] |
| CYCLE 4 | | P[0] | Q[0] | P[1] | Q[1] |
| CYCLE 5 | P[0] | Q[0] | P[1] | Q[1] | P[2] |
| CYCLE 6 | Q[0] | P[1] | Q[1] | P[2] | Q[2] |
| CYCLE 7 | P[1] | Q[1] | P[2] | Q[2] | P[3] |
| CYCLE 8 | Q[1] | P[2] | Q[2] | P[3] | Q[3] |
| CYCLE 9 | P[2] | Q[2] | P[3] | Q[3] | P[4] |
| CYCLE 10 | Q[2] | P[3] | Q[3] | P[4] | Q[4] |

METHOD AND APPARATUS FOR PERFORMING MONTGOMERY MULTIPLICATIONS

RESERVATION OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to network security and, more specifically, to methods and apparatuses for performing Montgomery multiplications.

2. Description

Public key cryptography is a part of key exchange/connection setup protocols such as the Internet Key Exchange protocol (IKE) (used in IP security protocol (IPSEC)) and the Secure Sockets Layer protocol (SSL). Public key security schemes such as Diffie-Hellman key exchange, Rivest Shamir Adleman (RSA) ciphering, RSA digital signature, and digital signature authority (DSA) are commonly used for this purpose. Public key security schemes are known to be very computationally intensive. The computation that is at the heart of most public key security schemes is modular exponentiation with very large numbers. 512 bit and 1024 bit numbers (keys) are normally used these days and there is a desire to increase the key size. It is very likely that the size of the operands of the modular exponentiation operation will increase to 2048 and 4096 bit numbers and beyond in the near future. The Montgomery multiplication is a commonly used method for performing the modular exponentiation operations. In order to perform key exchange/connection setup at the rates required in today's networks, specialized modular exponentiation hardware is required. When the Montgomery multiplication is used, the specialized modular exponentiation hardware mainly comprises one or more Montgomery multiplication engines. The speed of the Montgomery multiplication engines affects the speed of performing key exchange/connection setup in network communications. Therefore, it is desirable to improve the efficiency of a Montgomery multiplication engine.

BRIEF DESCRIPTION OF THE DRAWINGS

The features and advantages of the present invention will become apparent from the following detailed description of the present invention in which.

DETAILED DESCRIPTION

An embodiment of the disclosed techniques comprises a method and apparatus for improving the efficiency of a Montgomery multiplication engine. Montgomery multiplication is a commonly used method for performing the modular exponentiation operations, which may be the most computationally intensive part of a public key security scheme used for improving the security of network communications. A Montgomery multiplication may be performed through a number of iterations of one or more basic operations. Each basic operation may comprise an addition or a carry-save addition between two operands each having one or more bits. Typically the number of iterations equals to the key size, when the Montgomery multiplication is performed in an application of a public key security scheme. The key size in a public key based cryptographic application is typically 512 bits or 1024 bits in today's networks but is very likely to increase to 2048 bits or even higher. It is time-consuming to perform such a large number of basic operations (especially when a basic operation is an operation between two bits). According to an embodiment of the disclosed techniques, basic operations in an iteration may be grouped into multiple blocks. Operations involved in these blocks may be pipelined ("horizontal pipelining"). Additionally, blocks across different iterations may also be pipelined ("vertical pipelining"). Furthermore, two Montgomery multiplications may be interleaved and run on the same engine ("interleaving"). Using interleaving, horizontal pipelining, and vertical pipelining techniques, the efficiency of a Montgomery multiplication engine may be improved.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
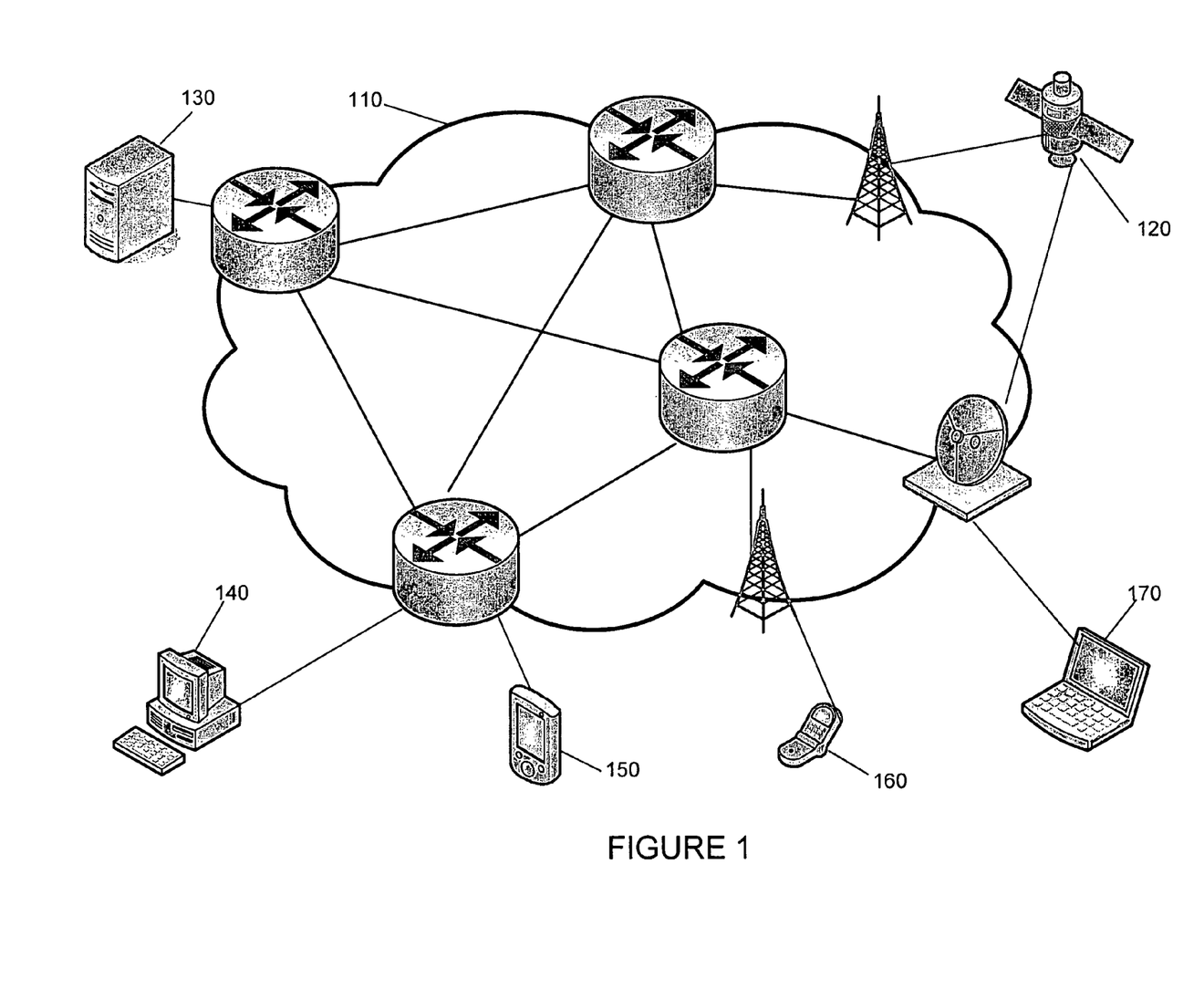
FIG. 1 is a diagram illustrating a general network system.

FIG. 1 depicts a general network system 110 that supports a number of terminals. The network system 110 may comprise a number of devices such as routers, switches, and bridges to facilitate data passage from one terminal to another. The network system may be a wireless system, an Ethernet system, any other systems, or a combination of different network systems. The network system may employ a satellite 120 to help connect one terminal to another terminal. The terminals of the network system may comprise servers (130), desktop computers (140), personal directory assistants (PDAs) (150), cell phones (160), laptop computers (170), or other devices. Data communicated among different terminals may include video, audio, messages, and other data. The network system may use key exchange/connection setup protocols such as IKE and SSL for communication security. Public key security schemes may be used as a part of such key exchange/connection setup protocols. To perform computationally intensive modular exponentiation for public key security schemes, Montgomery multiplications may be employed, which may be performed by one or more Montgomery multiplication engines ("MMEs"). To perform key exchange/connection setup at increasingly high rates required in always-evolving networks, it is desirable to improve the efficiency of the MMEs.

A public-key cryptographic scheme is an asymmetric security scheme (a sender and a receiver use different keys). It involves a pair of keys—a public key and a private key—associated with an entity that needs to authenticate its identity electronically or to sign or encrypt data. Each public key is published through a certificate authority, and the corresponding private key is kept secret. Compared with a symmetric security scheme (wherein a sender and a receiver use the same key), a public-key security scheme requires more computation (because of modular exponentiations used) and is therefore not always appropriate for large amounts of data. However, it is possible to use a public-key scheme to encrypt and send a symmetric key, which can then be used to encrypt additional data. This is the approach used by some security protocols such as the SSL protocol. In addition to encryption, a public-key security scheme can also be used for digital signature applications.

Figure 2:
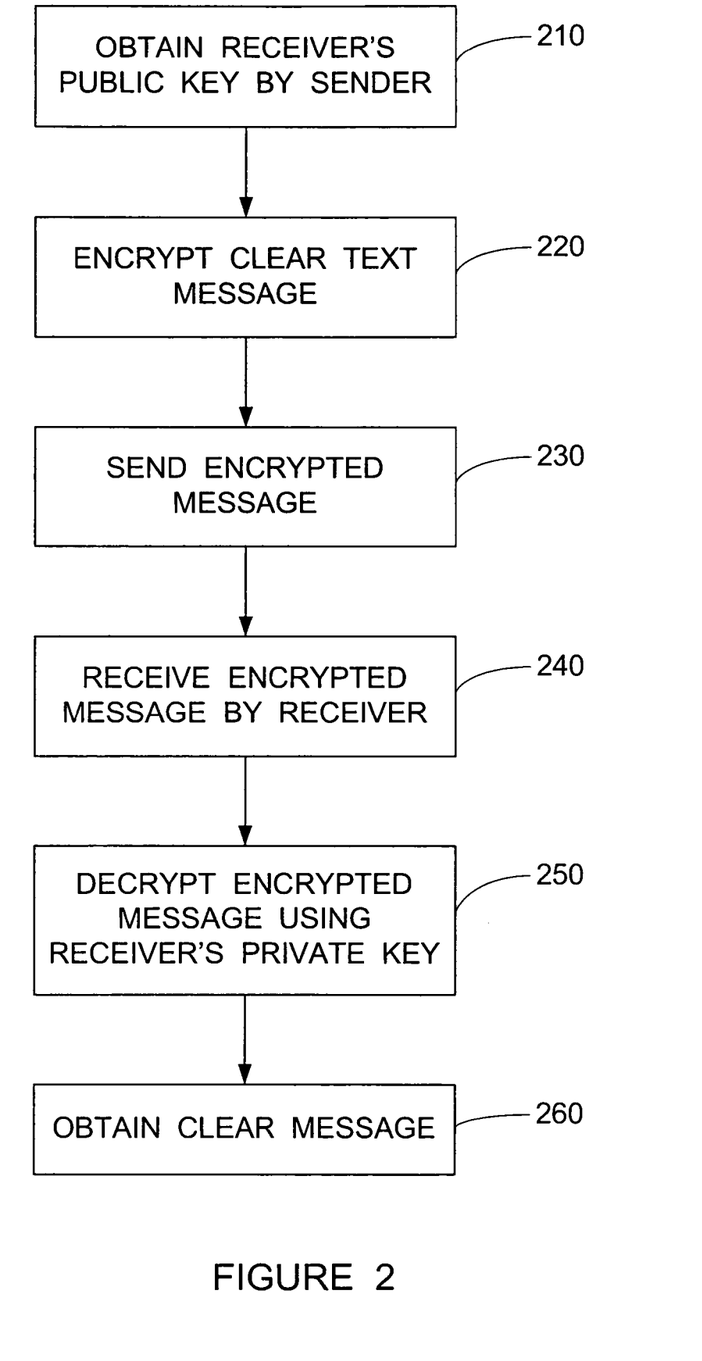
FIG. 2 is a flowchart illustrating an encrypted communicating process using a public key based security scheme (prior art)

FIG. 2 shows a flowchart of an encrypted communicating process using a public key based security scheme. In block 210, a sender may obtain a receiver's public key from a certificate authority. In block 220, the sender may use the public key to encrypt a clear text message. In block 230, the sender may send the encrypted message through a network. In block 240, the receiver may receive the encrypted message from the network. In block 250, the receiver may decrypt the receive d encrypted message using its private key. In block 260, the receiver may obtain the clear text message from the sender. Both the encryption process using the public key at the sender's side and the decryption process using the private key at the receiver's side involve a modular exponentiation, such as: $A^e$ (mod m), where A, e, and m denote the base, the exponent, and the modulus, respectively; and are all positive integers in a public key security scheme. It is very computationally intensive to perform a modular exponentiation using a conventional approach, which at least performs multiplication and modular reduction operations for e times. To make a modular exponentiation faster, a Montgomery multiplication based approach is typically used in a public key cryptographic system to perform the modular exponentiation.

To describe how a Montgomery multiplication is performed, it is necessary to introduce a concept of m-residue, where m is a modulus and is a k-bit integer. Let $r=2^k$, and the Montgomery multiplication requires that r and m be relatively prime to each other. This requirement is satisfied if m is odd. The m-residue of an integer A<m as a=A·r (mod m). Given two m-residues a and b, the Montgomery product is defined as the m-residue:

$$o = a \cdot b \cdot r^{-1} \pmod{m}, \quad (1)$$

where $r^{-1}$ is the inverse of r modulo m, i.e., $r^{-1} \cdot r = 1$ (mod m); and b=B·r (mod m). In fact, o is the m-residue of the product O=A·B (mod m), since o=a·b·r$^{-1}$ (mod m)=A·r·B·r·r$^{-1}$ (mod m)=O·r (mod m).

Figure 3:
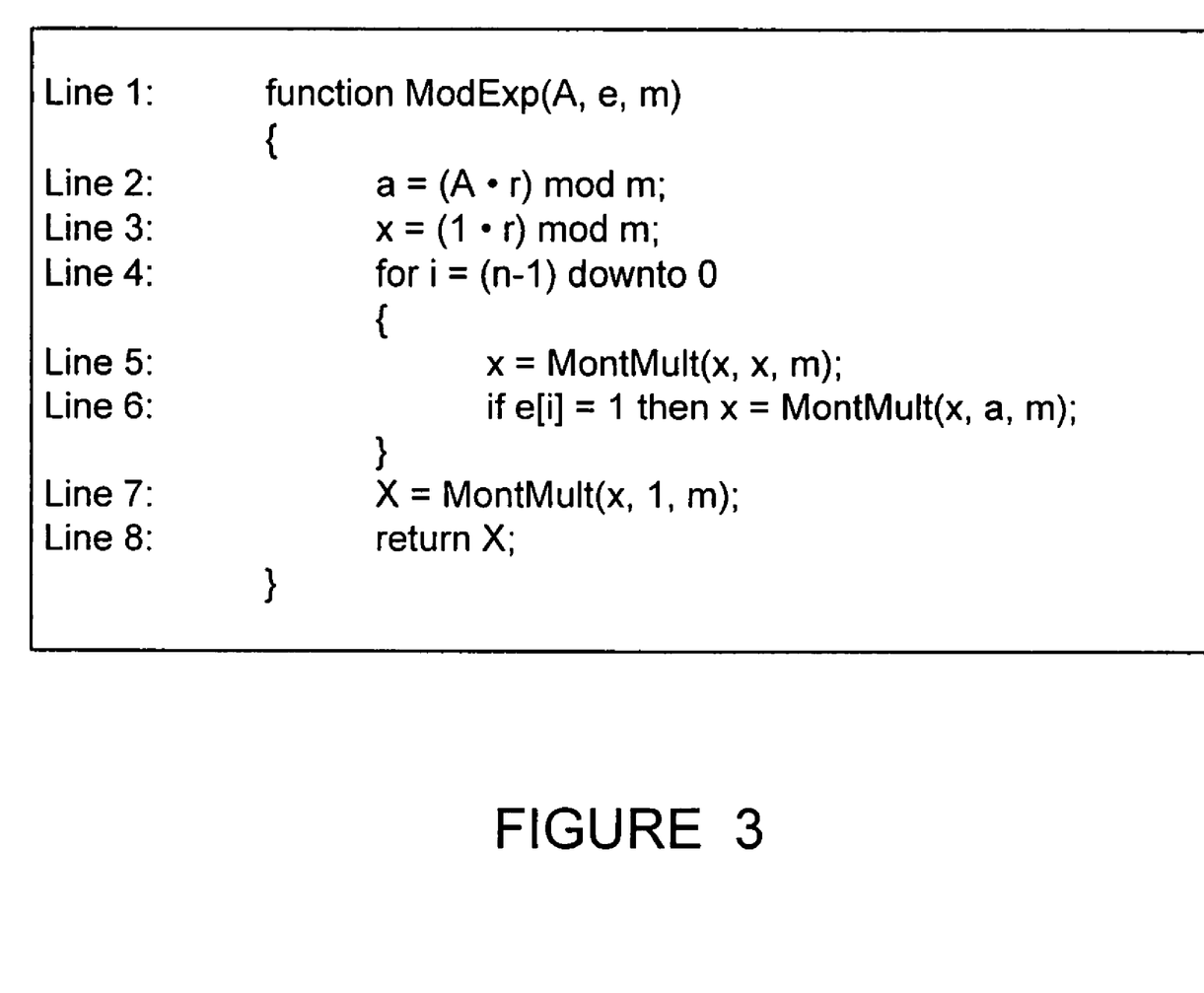
FIG. 3 shows pseudo code illustrating a process of performing a modular exponentiation using Montgomery multiplications in a public key based encryption process (prior art)

FIG. 3 shows pseudo code illustrating a process of performing a modular exponentiation, $A^e$ (mod m), using Montgomery multiplications in a public key based encryption process. Let n be the number of bits in the exponent e. Line 1 shows a function of modular exponentiation, ModExp(A, e, m), which computes $A^e$ (mod m). The function includes operations illustrated from line 2 through line 8. In line 2, the m-residue (a) of the base (A) is obtained. In line 3, the m-residue (x) of the number (1) is obtained. Line 4 starts a loop which includes n iterations, starting from the most significant bit of e, and each iteration comprises operations illustrated in lines 5 and 6. In line 5, a Montgomery product between x and x is calculated and its result is used to update the value of x. In line 6, if the current bit of e, e[i]=1, the value of x is further updated with a Montgomery product between x itself and the m-residue of the base A. Thus, depending on the value of the exponent, e, there can be either one or two Montgomery multiplications to be done per bit in e. Line 7 computes X using its m-residue via the property of the Montgomery multiplication, i.e., MontMult(x, 1, m)=x·1·r$^{-1}$ (mod m)=X·r·r$^{-1}$ (mod m)=X (mod m), where X is the result of the modular exponentiation, $A^e$ (mod m). Line 8 returns the value of X.

Figure 4A:
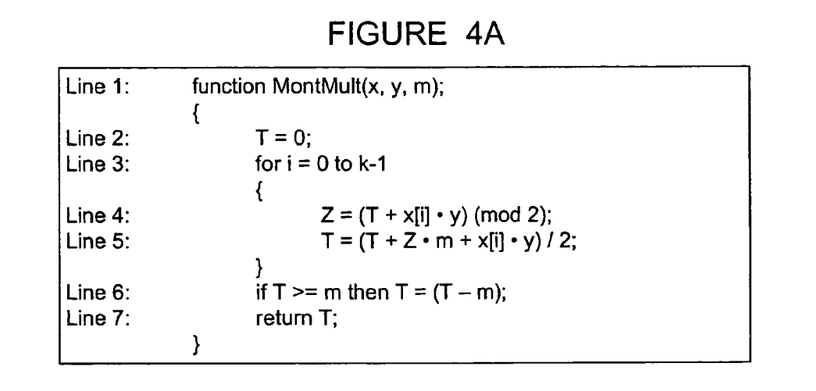
FIGS. 4A, 4B, and 4C show pseudo codes illustrating example processes of performing a Montgomery multiplication.

FIG. 4A shows a pseudo code of an example process of performing a Montgomery multiplication. Line 1 shows a function of a Montgomery multiplication, MontMult(x, y, m). The function takes three parameters, x, y, and m, where m is the same as the modulus in the modular exponentiation, $A^e$ (mod m), which MontMult is used to calculate. Parameters x, y, and m have the same number of bits (assume that the number of bits is k). For the convenience of description, a Montgomery multiplication with k-bit input parameters will be referred to as a k-size Montgomery multiplication. In line 2, a variable, T, which is used to store the Montgomery product between x and y, is initialized to 0. Line 3 starts k iterations of operations shown in lines 4 and 5. In line 4, a temporary result, Z, is obtained by (T+x[i]·y) (mod 2), where x[i] denotes the value of the i$^{th}$ bit of x. In line 5, the value of T is updated by (T+Z·m+x[i]·y)/2, where the dividing by 2 operation is basically "right shift by 1 bit" operation. After executing lines 4 and 5 for k iterations, the value of the result, T, is bounded within the range of 0 to 2m. Since the Montgomery product between x and y should be less than m (in the range of 0 to m−1), line 6 checks if the value of the result, T, is within the required range of 0 to m−1; and if not, a correction is made. Line 7 returns the final result of T, which is the Montgomery product between x and y.

Figure 4B:
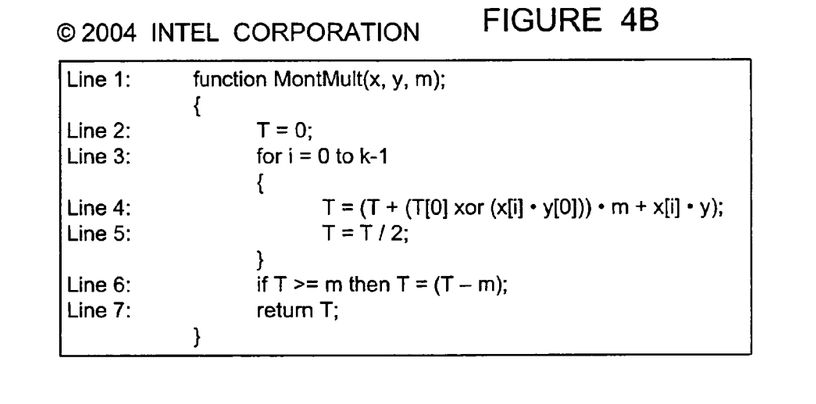

It is noted that addition of (Z·m) in line 4 of FIG. 4A is conditional. The addition occurs only when the result of (T+x[i]·y) (mod 2) is odd. Whether the result of (T+x[i]·y) (mod 2) is odd or not depends only on x[i] and the lowest bits of T and y (i.e., T[0] and y[0]). Thus, the pseudo code shown in FIG. 4A may be re-written as a pseudo code shown in FIG. 4B. It can be seen from FIG. 4B, especially lines 4 and 5, that a Montgomery multiplication mainly include k additions (shown in line 4) and k shift operations (shown in line 5), which are relatively simpler and relatively easier to be implemented in hardware than ordinary multiplications and modular reduction operations. Therefore, using Montgomery multiplications is potentially faster and simpler than ordinary multiplications and modular reduction operations to compute a modular exponentiation.

Figure 5:
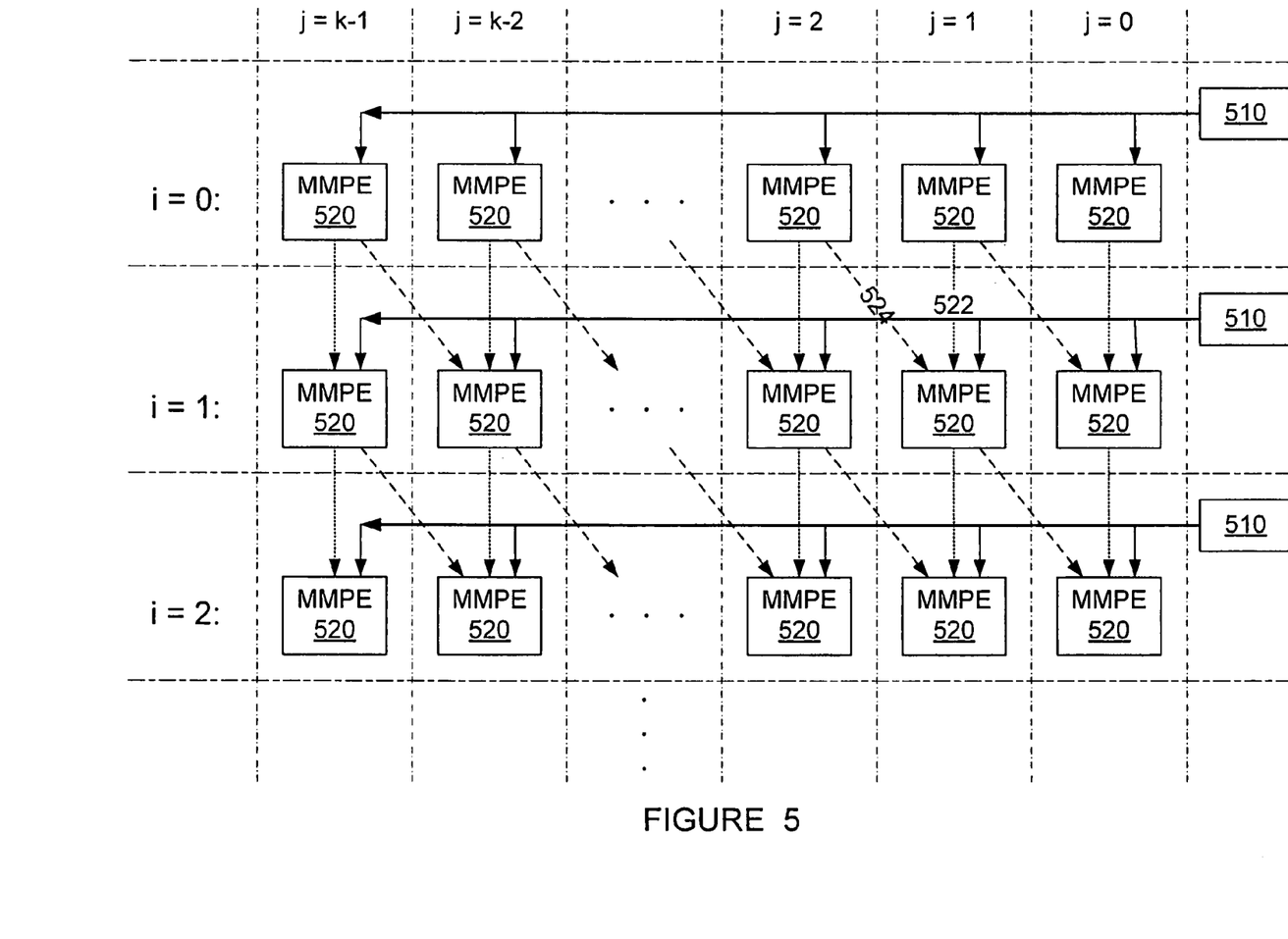
FIG. 5 is a diagram illustrating an example implementation of a Montgomery multiplication.

Although a glance of line 4 in FIG. 5 shows that this line involves additions of three operands: T, (T[0] xor (x[i]·y[0]))·m ("xor" denotes exclusive or operation), and x[i]·y, a more detailed analysis can show that this line may actually be implemented between two operands and thus may be performed through carry-save additions. One of these two operands is T, and the other is one of m, y, and (m+y), because only one of these three values is added with T during each iteration. Which value among m, y, and (m+y) is added with T depends on values of (T[0] xor (x[i]·y[0])) and x[i] as shown in the following table:

| Selection signals | T[0] xor (x[i]·y[0]) | x[i] | Value selected |
|---|---|---|---|
| sel_nothing | 0 | 0 | Nothing |
| sel_y | 0 | 1 | y |
| sel_m | 1 | 0 | m |
| sel_m&y | 1 | 1 | m + y |

Figure 4C:
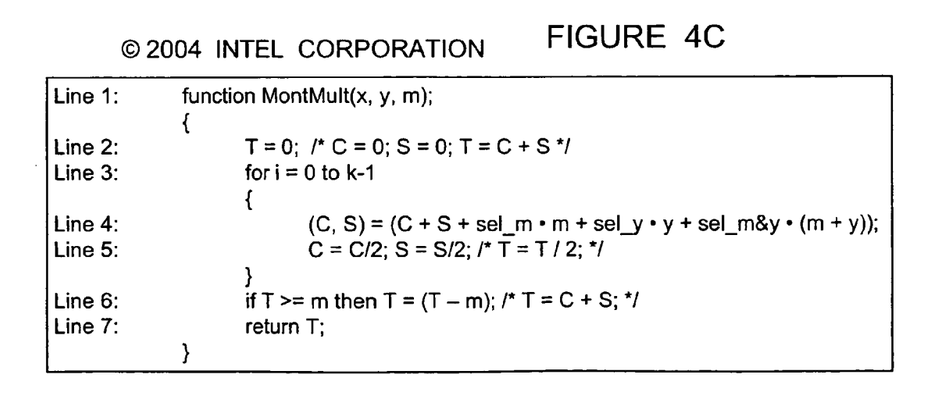

In fact, a multiplexer may be used to output four mutually exclusive selection signals for each iteration: sel_nothing, sel_y, sel_m, and sel_m&y, based on values of (T[0] xor (x[i]·y[0])) and x[i]. Because the value of (T[0] xor (x[i]·y[0])) determines if the modulus, m, should be added with T, (T[0] xor (x[i]·y[0])) will be referred to as a modulus selection indicator hereinafter. Under sel_nothing, nothing will be done and the value of previous T passes through; under sel_y, only the value of y is added with T; under sel_m, only the value of m is added with T; and under sel_m&y, the value of (m+y) is added with T. FIG. 4C shows a pseudo code illustrating an example process of performing a Montgomery multiplication through carry-save additions. In FIG. 4C, the variable T is represented by a sum of a carry variable, C, and a sum variable, S. Such an implementation may improve the performance of a Montgomery multiplication. Furthermore, bits in each of T, y, m, and m+y may be split into multiple bit groups with each bit group having a small number of bits, and for each iteration the carry-save addition between T and one value selected from 0, y, m, and m+y, may be performed based on these bit groups (e.g., if each bit group only contains 1 bit, the carry-save addition may be performed on a bit basis).

FIG. 5 illustrates an example implementation of a Montgomery multiplication. A Montgomery multiplication engine (MME) that uses this implementation may comprise k rows with each row representing one iteration of operations in lines 4 and 5 as shown in FIG. 4C. Each row comprises k Montgomery multiplication processing element ("MMPE") 520. For the convenience of description, MMPE(u, v) will be used to denote the MMPE at the intersection of row "i=u" and column "j=v;" and the number of MMPEs in each row is will be referred to as the width of the MME. Each MMPE performing a carry-save addition between one bit of T (as shown in FIG. 4C) and a corresponding bit of the selected value (one of 0, y, m, and m+y). For example, in a column corresponding to j=2, each MMPE performs a carry-save addition between the $3^{rd}$ bit of T and the 3 bit of the selected value. The value of (m+y) may be pre-calculated before the first iteration starts because both the value of m and the value of y are available before any iteration starts. Each row also comprises a selection mechanism 510 to compute the modulus selection indicator, (T[0] xor (x[i]·y[0])), and to make a selection among 0, y, m, and (m+y). The selection mechanism 510 may comprise a multiplexer to select one value among 0, y, m, and (m+y) and output this selected value for the use by each of k MMPEs in the row. In one embodiment, the selection mechanism may calculate a value of the modulus selection indicator, and propagate the value to each MMPE in the row. Each MMPE includes a multiplexer to select a value among 0, y, m, and (m+y) based on the value of the modulus selection indicator and x[i].

In the first row (i=0), each MMPE may simply pass through the bit in the selected value as the sum value of the output because T is initialized as 0 in line 2 (as shown in FIG. 4C). The output data from carry-save additions in the first row are shifted to right by one bit because of the division operation in line 5 as shown in FIG. 4C. In the second row (i=1) and forward, each MMPE takes a carry value and a sum value from MMPEs in the first raw and added with a corresponding bit of a value selected from 0, y, m, and (m+y), by the selection mechanism 510 in the second row. For example, the MMPE(1,1) takes the carry value from the MMPE(0, 0), the sum value of MMPE(0, 1) as well as the value selected by the selection mechanism 510 as input. Because of right shift operations in line 5 as shown in FIG. 4C, MMPE(1,1) instead takes the carry value from MMPE(0, 1) 522 and the sum value from MMPE(0, 2) 524 as well as the selected value as input. Since the values of carry and sum are shifted right by one bit position during each iteration, each iteration hence has a limited effect on the next iteration. For example, iteration 1 (i=1), bit 0 (MMPE(1, 0)) depends on iteration 0, bits 0 (MMPE(0, 0)) and 1 (MMPE(0, 1)). Iteration 2, bit 0 (MMPE (2, 0)) depends on bits 0, 1, and 2 of iteration 0 (MMPE(0, 0), MMPE(0, 1), and MMPE(0, 2)), and bits 0 and 1 of iteration 1 (MMPE(1, 0) and MMPE(1, 1)). In general, iteration u, bit v (MMPE(u, v)) would depend on bits v to v+u of iteration 0 (MMPE(0, v) to MMPE(0, v+u)), bits v to v+u−1 of iteration 1 (MMPE(1, v) to MMPE(1, v+u−1)), and so on.

Ideally, there should be a total of k rows of MMPEs and each row has k MMPEs, resulting in a total of $k^2$ MMPEs to implement a k-size Montgomery multiplication. In reality, however, a total of $k^2$ MMPEs may require a large die size, especially where k is large. Thus, only a few rows of k MMPEs (e.g., 8 rows) may actually be used to implement a k-size Montgomery multiplication. These rows may be reused to complete the total of k iterations of carry-save additions needed by a k-size Montgomery multiplication.

The size of a Montgomery multiplication is the same as the key size in a public key security scheme, which is typically 512 bits or higher. This means that there may be at least 512 MMPEs in each row in FIG. 5. The carry propagation across the width of an MME may take some time. Additionally, propagation of the value of the modulus selection indicator or a selected value among 0, y, m, and (m+y) across the width of the MME may also cause some delays. Such propagation delays may limit the throughput of an MME. One approach to improve the throughput of an MME may be pipelining carry-save additions performed by MMPEs. The carry-save additions may be pipelined both across the width of an MME ("horizontal pipelining") and across iterations ("vertical pipelining").

Because of propagation delays, operations involved in one iteration may not be completed in one cycle. Under horizontal pipelining, k MMPEs in a row may be grouped into several blocks so that operations involved in each block may be performed within one clock cycle. Operations involved in each block may be pipelined across blocks. For example, for a 512-size Montgomery Multiplication, a row of 512 MMPEs may be grouped into 5 blocks: block 1 including MMPEs for bits 0-7, block 2 including MMPEs for bits 8-127, block 3 including MMPEs for bits 128-255, block 4 including MMPEs for bits 256-383, and block 5 including MMPEs for bits 384-511. In block 1 includes less bit-wise carry-save additions because the value of the modulus selection indicator is also calculated in block 1 (this value needs to be calculated before the carry-save addition for bit 0). In one embodiment, the value of the modulus selection indicator calculated in block 1 may be propagated to other blocks so that MMPEs there may select one value among 0, y, m, and (m+y) using a multiplexer associated with each MMPE. In another embodiment, this value may be used along with x[i] to select one value among 0, y, m, and (m+y) via a multiplexer and then propagate the selected value to other blocks. Operations involved in these 5 blocks (for a 512-size Montgomery multiplication) may be pipelined to improve the MME.

There is a similar limitation on the number of iterations that can be done every cycle. Under vertical pipelining, a group of iterations may be performed a horizontal block within one cycle. The size of the group may be different for different implementations. For example, the size of the group may be 8 so that 8 iterations may be performed for a horizontal block in one cycle. Because of inter-iteration dependency, the MMPE (7, 7) depends on results from MMPE(0, 7) to MMPE(0, 14), MMPE(1, 7) to MMPE(1, 13), . . . , and MMPE(6, 7) to MMPE(6,8). If block 1 is defined as operations involved in bits 0-7, then to be relatively independent, operations involved in 8 iterations for block 1 should also include operations performed by MMPE(0, 7) to MMPE(0, 14), MMPE(1, 7) to MMPE(1, 13), . . . , and MMPE(6, 7) to MMPE(6,8). In general, M iterations for block w should also include those operations that are needed to make operations involved in M iterations for block w relatively independent.

Although FIG. 5 illustrates one embodiment in which each MMPE performs a carry-save addition between two bits, an MMPE is not required to perform a bitwise carry-save addition only. An MMPE may perform a basic operation as required by a Montgomery multiplication. Such a basic operation may comprise a bitwise carry-save addition, a carry-save addition between two operations each having more than one bit, an addition between two operations each including one or more bits, or any other operation(s). The application of horizontal and vertical pipelining techniques does not depend on what particular operations an MMPE performs.

Figure 6:
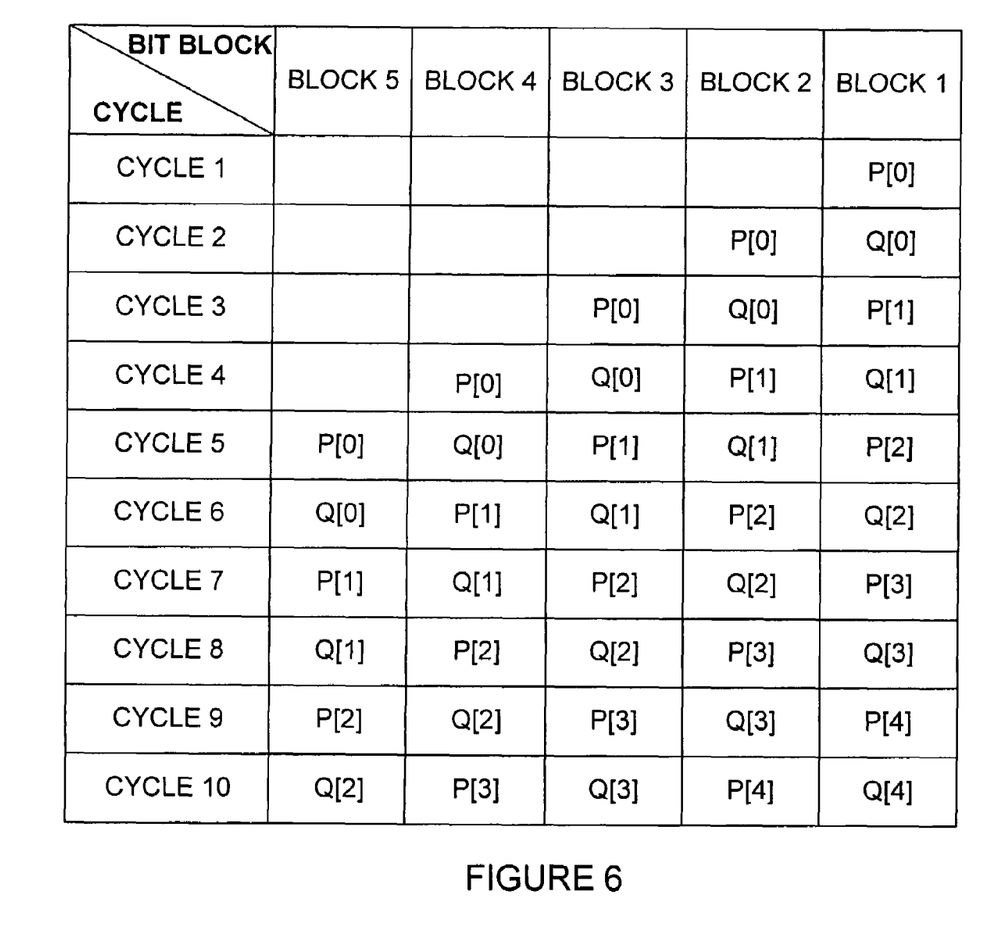
FIG. 6 is a table illustrating a process of scheduling Montgomery multiplications.

FIG. 6 is a table illustrating how to schedule two Montgomery multiplications using interleaving, and horizontal and vertical pipelining techniques. Assume that operations involved in one iteration are grouped into 5 horizontal blocks and 8 iterations may be grouped together so that 8 iterations may be performed for a horizontal block in one cycle. Let P[i] denote operations involved in iterations i×8 through (i+1)× 8−1 for a horizontal block of Montgomery multiplication P (e.g., P[0] denote operations involved in iterations 0 through 7 for a horizontal block of Montgomery multiplication P). Q[i] has the same meaning as P[i], but is used for a different Montgomery multiplication Q. In cycle 1, P[0] of block 1 (i.e., operations involved in iterations 0-7 for block 1 of P) is performed. In cycle 2, P[0] of block 2 (i.e., operations involved in iterations 0-7 for block 2 of P) may be performed. However, P[1] of block 1 (i.e., operations involved in iterations 8-15 for block 1 of P) cannot be performed because P[1] of block 1 depend on results from P[0] of block 2. To fully make use of the capacity of an MME, another Montgomery multiplication, Q, for another unrelated modular exponentiation may be performed. As a result, two unrelated Montgomery multiplications, P and Q, may be interleaved to improve the efficiency of an MME. Thus, in cycle 2, although P[1] of block 1 cannot be performed because of inter-iteration dependency, Q[0] of block 1 (i.e., operations involved in iterations 0-7 for block 1 of Q) may be performed.

In cycle 3, P[0] of block 3 may be performed and Q[0] of block 2 may be performed. In this cycle, P[1] of block 1 may be performed because the results from P[0] of block 2 are now available. In cycle 4, P[0] of block 4 and P[1] of block 2 may be performed, but P[2] of block 1 cannot be performed because P[2] of block 1 depend on results of P[1] of block 2. Also in this cycle, Q[0] of block 3 and Q[1] of block 1 may be performed. In cycle 5, P[0] of block 5, P[1] of block 3, and P[2] of block 1 may be performed. In the meanwhile, Q[0] of block 4 and Q[1] of block 2 may be performed. Because of horizontal pipelining, different horizontal blocks (i.e., block 1, block 3, and block 5) of Montgomery multiplication P are performed in the same cycle (cycle 5). Additionally, because of vertical pipelining, different iteration groups (i.e., iterations 0-7 for block 5, iterations 8-15 for block 3, and iterations 16-23 for block 1) of the same Montgomery multiplication P are also performed in the same cycle (cycle 5). Furthermore, because of interleaving, Q[0] of block 4 and Q[1] of block 2 for another unrelated Montgomery multiplication Q are also performed in cycle 5. The process of performing Montgomery multiplications, P and Q, through interleaving, and horizontal and vertical pipelining may continue from cycle 6 and forward. Results from 8 iterations for each horizontal block may be buffered and used by next cycles. Once these results are used by all dependent blocks, they may be cleared from a buffer so that the buffer may be used by other results.

Although both the horizontal and vertical pipelining technique and the interleaving technique are described above along with FIG. 6, they are not required to be used together in one embodiment. For example, the horizontal pipelining and/ or vertical pipelining may be used in one embodiment without the interleaving technique; in another embodiment, the interleaving technique may be used without the horizontal and vertical pipelining techniques.

Figure 7:
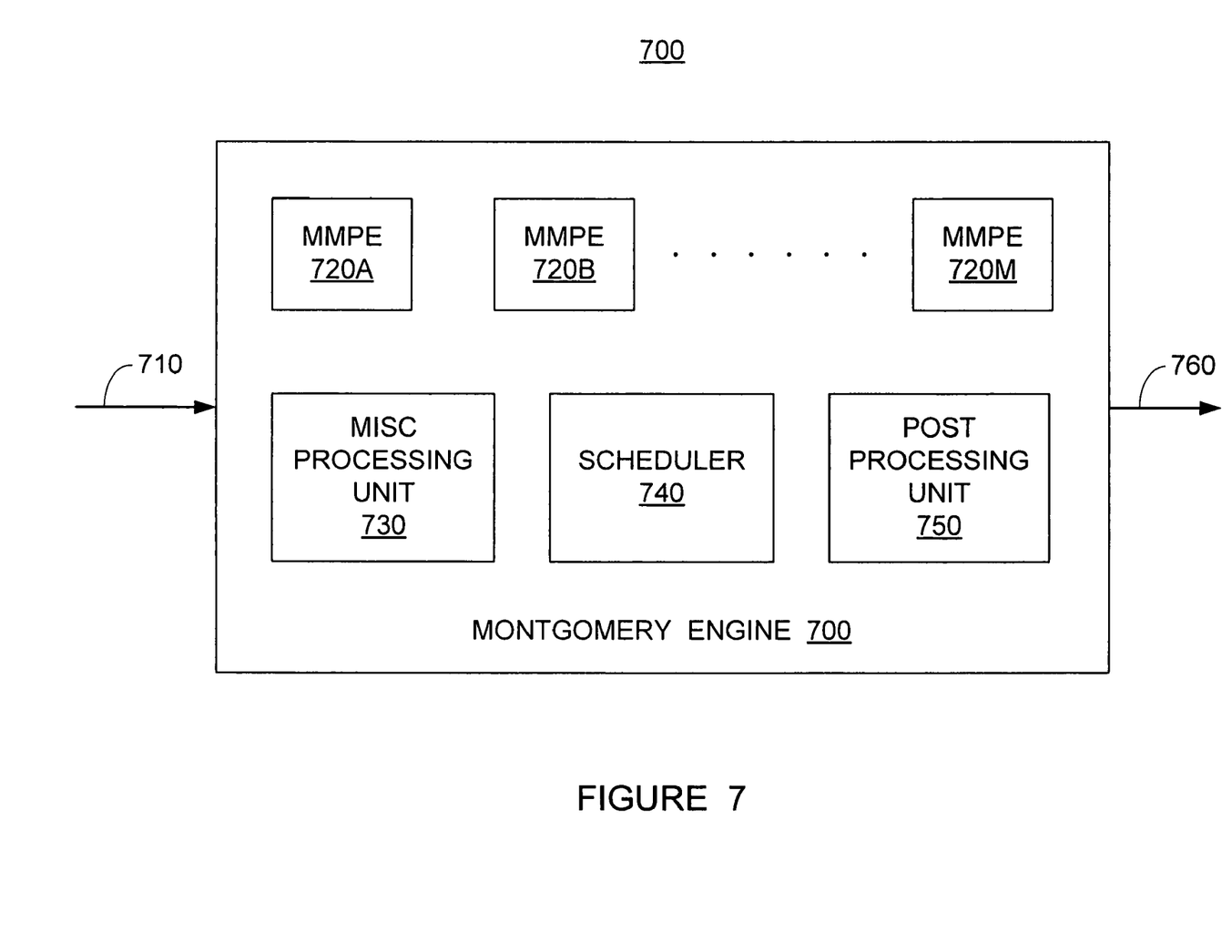
FIG. 7 is a block diagram of a Montgomery multiplication engine.

FIG. 7 is a block diagram of a Montgomery multiplication engine (MME) 700. The MME 700 may accept three parameters (together shown as 710) as input for a Montgomery multiplication (If there are two Montgomery multiplications, the MME may accept two sets of parameters, each set for one Montgomery multiplication). All three parameters have the same number of bits. One of these three parameters is the modulus, m, of a modular exponentiation which the MME is used to compute. The MME 700 outputs one result 760 for each Montgomery multiplication, which is within the range of 0 and m−1. The MME 700 may comprise a plurality of MMPEs (e.g., 720A, 720B, . . . , 720M). Each MMPE may perform a basic operation (e.g., an addition or a carry-save addition between two operands each including one or more bits). These MMPEs may form several rows with each row comprising multiple MMPEs, enough to compute basic operations for one iteration of a Montgomery multiplication. MMPEs between two adjacent rows may have similar inter-row dependencies as shown in FIG. 5. Rows of MMPEs may be reused across iterations. In one embodiment, MMPEs might not be arranged in a way (e.g., in rows) similar to that as shown in FIG. 5, but still perform similar functions as those MMPEs in FIG. 5 do.

The MME 700 may also comprise a scheduler 740 to schedule operations required by a Montgomery multiplication among components inside the MME. For example, the scheduler 740 may interleave two Montgomery multiplications for two unrelated modular exponentiations into the MME. Additionally, the scheduler 740 may schedule the MME components such that process of performing each Montgomery multiplication may be pipelined both horizontally and vertically in a manner as described in FIG. 6.

Additionally, the MME 700 may comprise a post-processing unit to process the output data from k iterations of operations to produce a final result 760 for the Montgomery multiplication. The value of the final result is within the range of 0 to m−1. The post-processing unit produces final results for two interleaving Montgomery multiplications. Moreover, the MME 700 may comprise a miscellaneous processing unit ("misc processing unit") 730 to perform any additional operations required to complete a Montgomery multiplication. Such additional operations, for example, may include initialization of an intermediate result (e.g., set T=0 as show in line 2 of FIG. 4C), pre-calculation (e.g., pre-calculating (m+y) before any iteration, as shown in FIG. 4C), calculation of other values such as the modulus selection indicator in the beginning of each iteration, and so on. The misc processing unit 730 works for both of the two interleaving Montgomery multiplications. The MME 700 may also comprise other components such as, for example, buffers to store temporary results.

Figure 8:
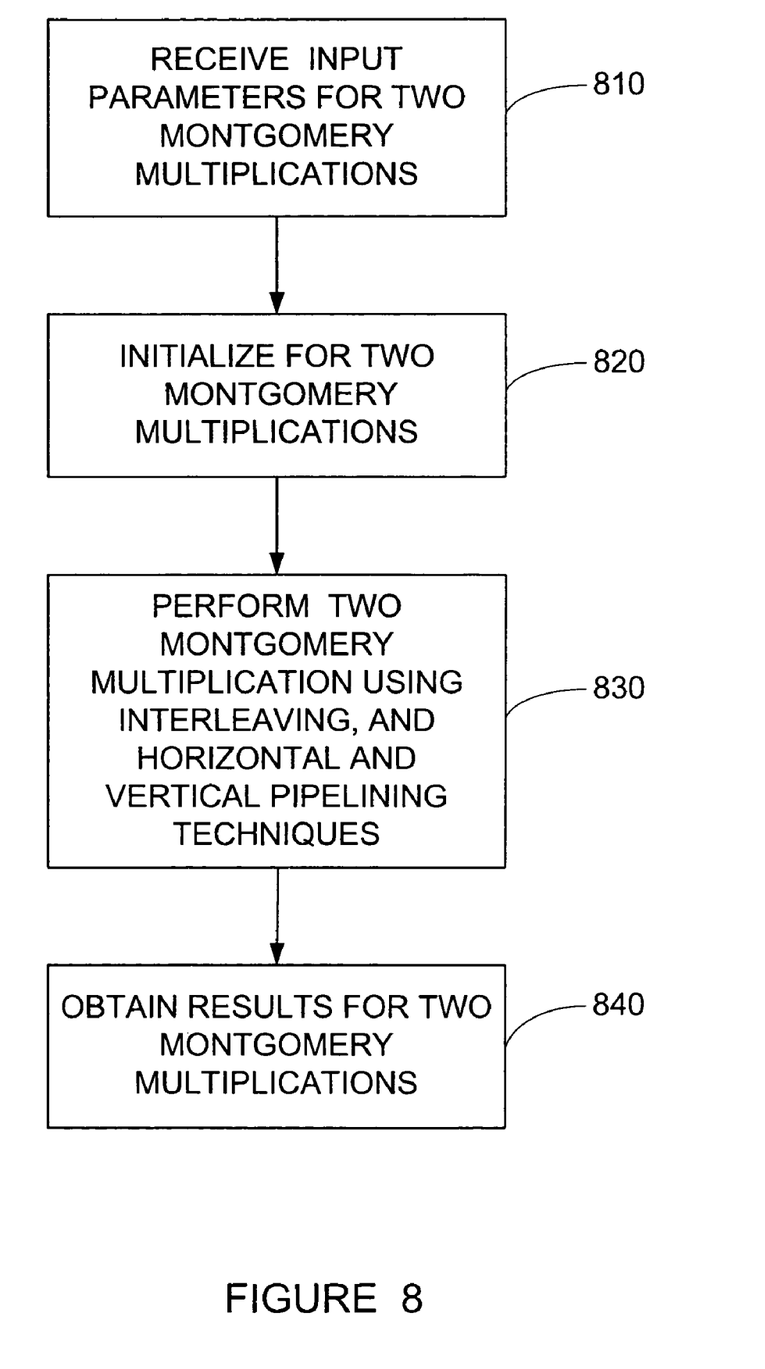
FIG. 8 is a flowchart illustrating an example process of performing Montgomery multiplications.

FIG. 8 shows a flowchart of an example process of performing Montgomery multiplications. In block 810, two sets of input parameters may be received for two Montgomery multiplications. Each set of input parameters may include three parameters with the same number of bits. In block 820, two Montgomery multiplications may be initialized. The initialization process may include setting an intermediate result to 0 (e.g., T=0 as shown in FIG. 4C) and pre-calculating a sum of two input parameters (e.g., m+y as shown in FIG. 4C). In block 830, two Montgomery multiplications may be performed using interleaving, horizontal and vertical pipelining techniques as disclosed above (see descriptions for FIGS. 5-7). The processing of performing a Montgomery multiplication may include iterations of multiple basic operations and other operations such as calculating the value of the modulus selection indicator in the beginning of each iteration. In block 840, a final result for each Montgomery multiplication may be obtained by post-processing the intermediate result to ensure that the final result is within a required range.

Figure 9:
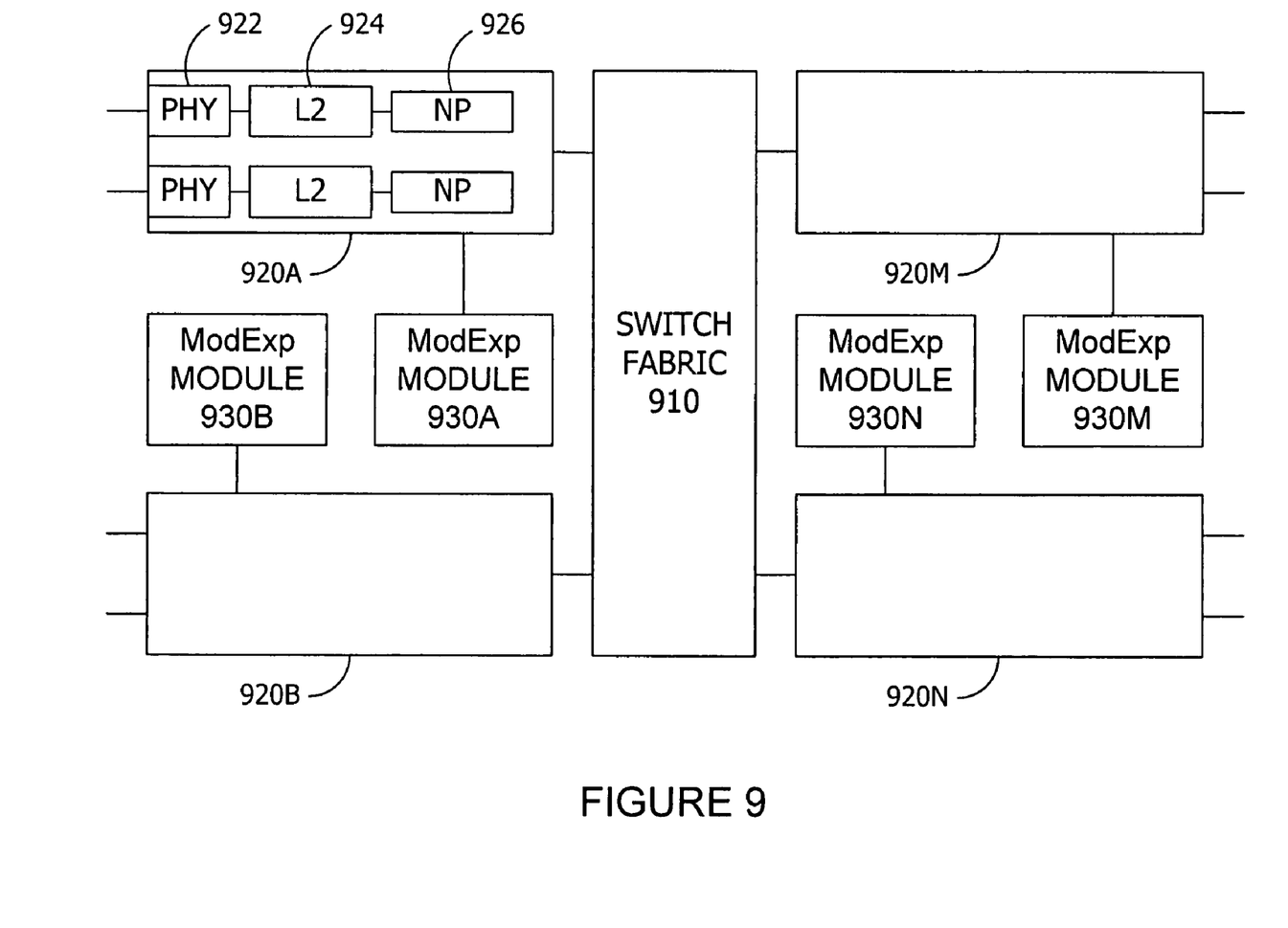
FIG. 9 is a diagram of a network system that incorporates a Montgomery multiplication based modular exponentiation module.

FIG. 9 is a diagram of a network system that incorporates a Montgomery multiplication based modular exponentiation module. The system may comprise a collection of line cards 920 ("blades") interconnected by a switch fabric 910 (e.g., a crossbar or shared memory switch fabric). Individual line cards may be located in the same physical location or different physical locations (e.g., different cities). The switch fabric, for example, may conform to Common Switch Interface (CSIX) or other fabric technologies such as HyperTransport, Infiniband, Peripheral Component Interconnect (PCI), Packet-Over-SONET (Synchronous Optic Network), RapidIO, and/or UTOPIA (Universal Test and Operations PHY (Physical Layer) Interface for ATM).

Individual line cards (e.g., 920A) may include one or more physical layer (PHY) devices 922 (e.g., optic, wire, and wireless PHYs) that handle communication over network connections. The PHYs translate between the physical signals carried by different network mediums and the bits (e.g., "0"-s and "1"-s) used by digital systems. The line cards 920 may also include framer devices (e.g., Ethernet, Synchronous Optic Network (SONET), High-Level Data Link (HDLC) framers or other "layer 2" devices) 924 that can perform operations on frames such as error detection and/or correction. The line cards 920 shown may also include one or more network processors 926 that perform packet processing operations for packets received via the PHY(s) 922 and direct the packets, via the switch fabric 910, to a line card providing an egress interface to forward the packet. Potentially, the network processor(s) 926 may perform "layer 2" duties instead of the framer devices 924.

The network processor(s) 926 may be an Intel® Internet eXchange network Processor (IXP) or other network processors featuring different designs. The network processor features a collection of packet processing engines on a single integrated circuit. Individual engines may provide multiple threads of execution. Additionally, the network processor includes a core processor (that is often programmed to perform "control plane" tasks involved in network operations. The core processor, however, may also handle "data plane" tasks. The network processor 926 also features at least one interface that can carry packets between the processor and other network components. For example, the processor can feature a switch fabric interface 910 that enables the processor 926 to transmit a packet to other processor(s) or circuitry connected to the fabric. The processor(s) 926 can also feature an interface that enables the processor to communicate with physical layer (PHY) and/or link layer devices (e.g., MAC or framer devices). The processor 926 also includes an interface (e.g., a Peripheral Component Interconnect (PCI) bus interface) for communicating, for example, with a host or other network processors. Moreover, the processor 926 also includes other components shared by the engines such as memory controllers a hash engine, and internal scratchpad memory.

As shown in FIG. 9, each line card 920 may be operably coupled with at least one Modular Exponentiation (ModExp) module 930 (e.g., 930A) that comprises at least one MME to perform Montgomery multiplications for modular exponentiations. Interleaving, horizontal pipelining, and vertical pipelining techniques may be used to perform Montgomery multiplications. In one embodiment, the ModExp module may be separate from the line card. In another embodiment, the ModExp module may be integrated with the line card. Also in one embodiment, the ModExp module may be a part of the network processor 926 or a part of the PHY 922. Yet in another embodiment, the ModExp module may be located in other network layers such as a link layer, a network layer, and/or an application layer.

Although an example embodiment of the present disclosure is described with reference to diagrams in FIGS. 1-9, persons of ordinary skill in the art will readily appreciate that many other methods of implementing the present invention may alternatively be used. For example, the order of execution of the functional blocks or process procedures may be changed, and/or some of the functional blocks or process procedures described may be changed, eliminated, or combined.

In the preceding description, various aspects of the present disclosure have been described. For purposes of explanation, specific numbers, systems and configurations were set forth in order to provide a thorough understanding of the present disclosure. However, it is apparent to one skilled in the art having the benefit of this disclosure that the present disclosure may be practiced without the specific details. In other instances, well-known features, components, or modules were omitted, simplified, combined, or split in order not to obscure the present disclosure.

Embodiments of the present disclosure described herein may be implemented in circuitry, which includes hardwired circuitry, digital circuitry, analog circuitry, programmable circuitry, and so forth. They may also be implemented in computer programs. Such computer programs may be coded in a high level procedural or object oriented programming language. However, the program(s) can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable storage medium, configured for use with a processing system, where the storage medium so configured causes the processing system to operate in a specific and predefined manner to perform the functions described herein.

While this disclosure has been described with reference to illustrative embodiments, this description is not intended to be construed in a limiting sense. Various modifications of the illustrative embodiments, as well as other embodiments of the disclosure, which are apparent to persons skilled in the art to which the disclosure pertains are deemed to lie within the spirit and scope of the disclosure.

What is claimed is:

1. A processor having a Montgomery multiplication engine to perform an encryption/decryption process in a network system, the Montgomery multiplication engine comprising:
a plurality of Montgomery multiplication processing elements (MMPEs) to perform basic operations for at least one Montgomery multiplication; and
a scheduler to schedule the plurality of MMPEs to pipeline a process of performing the basic operations both horizontally and vertically for a Montgomery multiplication of the at least one Montgomery multiplication, the Montgomery multiplication comprising a plurality of iterations of N basic operations, wherein N is a positive integer, wherein the horizontal pipelining comprises grouping the N basic operations within an iteration into a plurality of horizontal blocks and pipelining operations involved in the plurality of horizontal blocks.

2. The processor of claim 1, wherein a basic operation comprises an addition.

3. The processor of claim 1, wherein the scheduler further schedules the plurality of MMPEs to interleave processes of performing the basic operations for two separate Montgomery multiplications.

4. The processor of claim 1, wherein the vertical pipelining comprises pipelining the N basic operations across iterations.

5. The processor of claim 1, further comprising a miscellaneous processing unit to initialize the at least one Montgomery multiplication, to calculate a sum between two input parameters, and to determine values of a plurality of modulus selection indicators.

6. The processor of claim 5, further comprising a post processing unit to process output data from a plurality of iterations of a number of basic operations to produce a final result for the at least one Montgomery multiplication.

7. A method for performing Montgomery multiplications by a Montgomery multiplication engine in a network system to perform an encryption/decryption process, comprising:
receiving input parameters for at least one Montgomery multiplication;
initializing the Montgomery multiplication engine for the at least one Montgomery multiplication;
performing basic operations required to complete the at least Montgomery multiplication, wherein a process of performing the basic operations is pipelined; and
producing a result for the at least one Montgomery multiplication;
wherein pipelining the process of performing the basic operations comprises both a horizontal pipelining and a vertical pipelining for a Montgomery multiplication, the Montgomery multiplication comprising a plurality of iterations of N basic operations, wherein N is a positive integer;
wherein the horizontal pipelining comprises grouping the N basic operations within an iteration into a plurality of horizontal blocks and pipelining operations involved in the plurality of horizontal blocks.

8. The method of claim 7, wherein a basic operation comprises an addition.

9. The method of claim 7, further comprising interleaving processes of performing the basic operations for two separate Montgomery multiplications.

10. The method of claim 7, further comprising calculating a modulus selection indicator, and selecting an operand for a basic operation based on the calculated modulus selection indicator.

11. The method of claim 7, wherein the number of the plurality of iterations equals the number of bits in at least one input parameter of the Montgomery multiplication.

12. The method of claim 7, wherein the vertical pipelining comprises pipelining the N basic operations across iterations.

13. A network system, comprising:
a switch fabric;
a plurality of line cards interconnected by the switch fabric; and
a plurality of modular exponentiation modules, each operably coupled with a line card to perform at least one modular exponentiation using at least one Montgomery multiplication engine, a Montgomery multiplication engine including:
a plurality of Montgomery multiplication processing elements (MMPEs) to perform basic operations for at least one Montgomery multiplication, and
a scheduler to schedule the plurality of MMPEs to pipeline a process of performing the basic operations both horizontally and vertically for a Montgomery multiplication of the at least one Montgomery multiplication, the Montgomery multiplication comprising a plurality of iterations of N basic operations, wherein N is a positive integer, wherein the horizontal pipelining comprises grouping the N basic operations within an iteration into a plurality of horizontal blocks and pipelining operations involved in the plurality of horizontal blocks.

14. The network system of claim 13, wherein a basic operation comprises an addition.

15. The network system of claim 13, wherein the scheduler further schedules the plurality of MMPEs to interleave processes of performing the basic operations for two separate Montgomery multiplications.

16. The network system of claim 13, wherein the vertical pipelining comprises pipelining the N basic operations across iterations.

* * * * *